Nov. 9, 1971

M. B. PARKER 3,618,461

PROCESS OF MACHINING A METAL IN CONTACT WITH A COMPOSITION OF CHLOROFLUORO- AND NITROALKANES

Filed Jan. 9, 1970

INVENTOR
MURRAY BORTON PARKER

BY *Francis J. Crowley*

ATTORNEY 3,618,461
PROCESS OF MACHINING A METAL IN CONTACT WITH A COMPOSITION OF CHLOROFLUORO- AND NITROALKANES
Murray Borton Parker, Hockessin, Del., assignor to E. I. du Pont de Nemours and Company, Wilmington, Del.
Filed Jan. 9, 1970, Ser. No. 1,812
Int. Cl. B23c 1/00
U.S. Cl. 90—11 C          6 Claims

ABSTRACT OF THE DISCLOSURE

The process of machining a metal in contact with a cutting fluid comprising trichlorofluoromethane or 1,1,2-trichloro-1,2,2-trifluoroethane and from about 0.5 percent to 15 percent by weight of a nitroalkane having 1 or 2 carbon atoms.

BACKGROUND OF THE INVENTION

(1) Field of the invention

This invention relates to a process of machining a metal, for example, drilling, routing, tapping, threading, broaching, lathe turning or the like, in contact with a cutting fluid comprising a chlorofluoroalkine selected from trichlorofluoromethane or 1,1,2-trichloro-1,2,2-trifluoroethane and nitromethane or nitroethane.

(2) Description of the prior art

The machining of metal has been carried out in contact with various fluids which are recommended and used as cutting fluids. Such fluids of the prior art comprise mineral oils, fats, fatty acids, soaps, sulfonated oils, waxes, oil-water emulsions, etc. The usual shop practice has been to flood the work and tool with a stream of the cutting fluid. Normally the fluid is recovered, especially in large operations, more or less purified, sometimes reconstituted, and then returned for reuse. E. L. H. Bastian summarized the state of the art in his book, Metal Working Lubricants, McGraw-Hill Book Co., Inc., New York, N.Y., (1951).

In field cutting operations as for example in the drilling of a partly assembled air frame, it is impractical to apply the usual shop practice of flooding the tool and work. In the past either no fluid at all was used, at least in the drilling of aluminum alloys, with consequent reduced tool life, or a cutting fluid was applied intermittently by brush or similar means. The nonevaporating fluids of the earlier prior art had to be removed by means such as wiping and frequently with a solvent, especially if the area was to be painted afterwards.

McLean in U.S. 3,129,182 disclosed machining a metal in contact with an evaporative cutting fluid, ethylene glycol monobutyl ether in 1,1,2-trichloro-1,2,2-trifluoroethane.

A process has now been discovered for machining of metal which process effects the prolongation of tool life.

SUMMARY OF THE INVENTION

The present invention is directed to a process of machining a metal in contact with a cutting fluid comprising a chlorofluoroalkane and a nitroalkane. The chlorofluoroalkane utilized is either 1,1,2-trichloro-1,2,2-trifluoroethane or trichlorofluoromethane and the nitroalkane which is present in an amount of from about 0.5 percent to 15 percent by weight of the cutting fluid, has either 1 or 2 carbon atoms.

Figure 1:
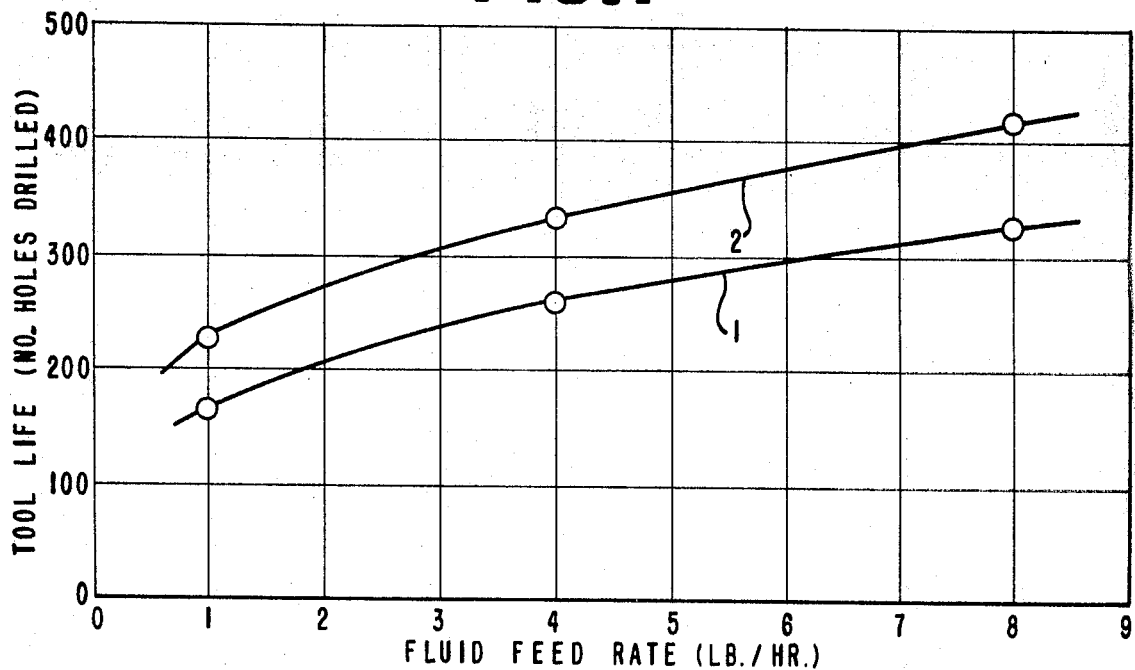

DESCRIPTION OF THE DRAWINGS (1) FIG. 1 is a plot of cutting fluid feed rate versus tool life in drilling aluminum alloy. The curve designated 1 represents the performance of ethylene glycol monobutyl ether in 1,1,2-trichloro-1,2,2-trifluoroethane. The curve designated 2 represents the performance of a compound (trichlorofluoromethane and 5% nitromethane) within the scope of this invention. The air flow rate was 4.80 standard cu. ft. (136 liters)/minute.

Figure 2:
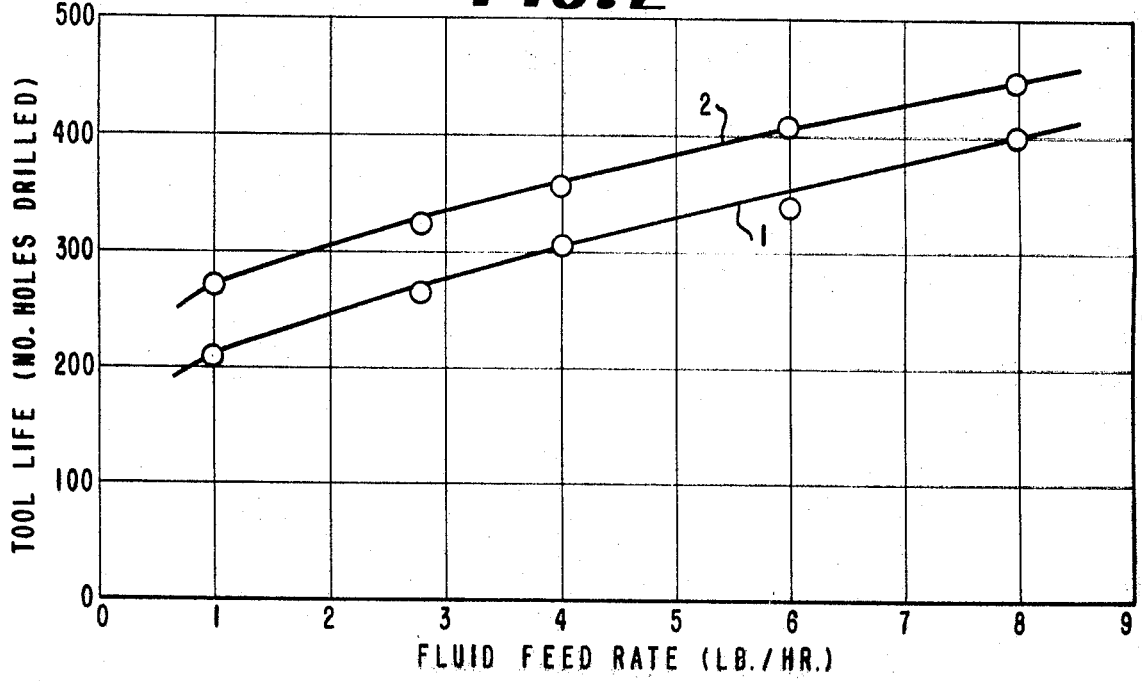

(2) FIG. 2 is a plot of cutting fluid feed rate versus tool life, as above, with the curves 1 and 2 representing the same entities as above but with an air flow rate of 7.85 standard cu. ft. (214 liters)/minute.

Figure 3:
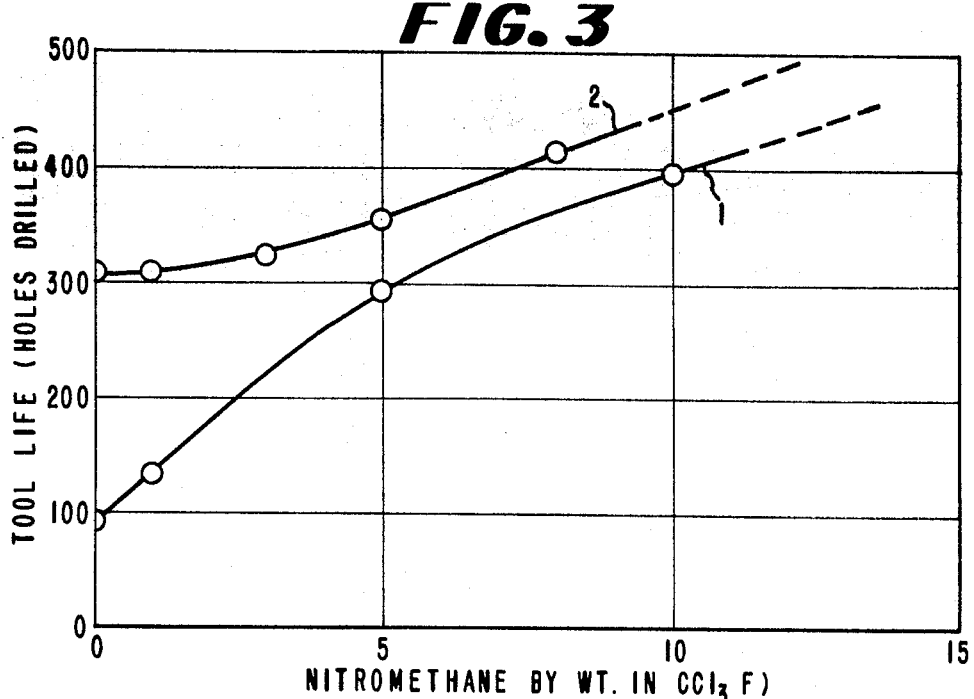

(3) FIG. 3 is a plot of nitroalkane concentration in a cutting fluid versus tool life in drilling aluminum alloy. The curve designated 1 represents the performance when using a solid stream nozzle for fluid introduction. The curve designated 2 represents the performance when a venturi nozzle is used.

Figure 4:
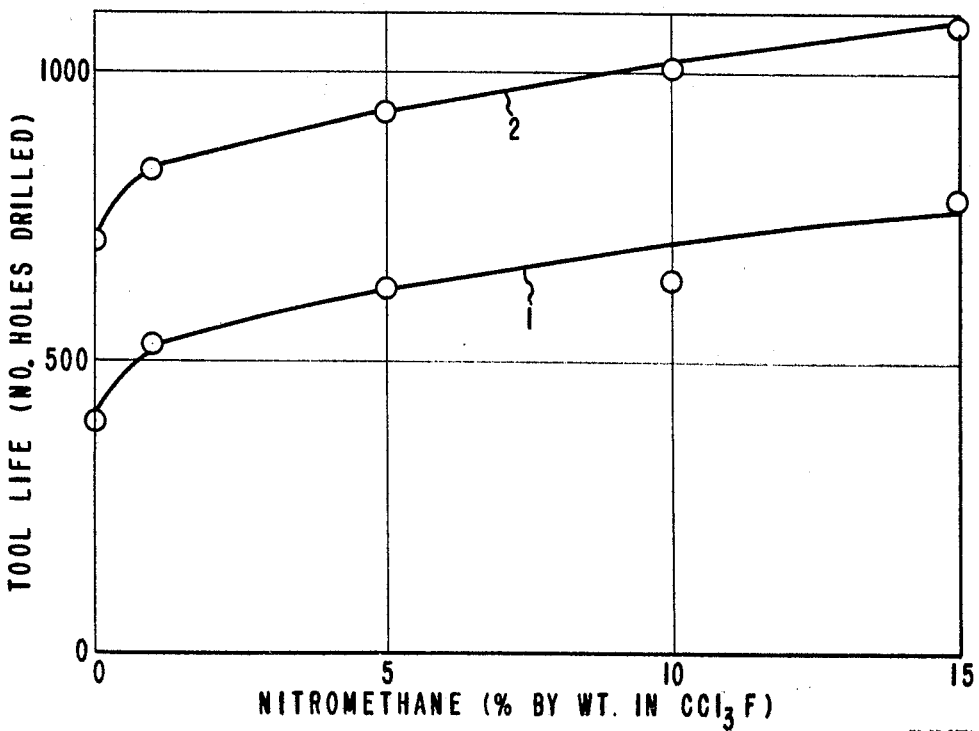

(4) FIG. 4 is a plot of nitroalkane concentration in a cutting fluid versus tool life in drilling aluminum alloy. The curve designated 1 represents the performance when the fluid feed rate was 4 lbs. (1.8 kg)/hr. and the air flow rate was 0.97 standard cu. ft. (28.2 liters)/min. The curve designated 2 represents the performance when the fluid feed rate was 2 lbs. (0.9 kg.)/hr. and the air flow rate was 2.03 standard cu. ft. (57.5 liters)/min.

DESCRIPTION OF THE INVENTION

The present invention comprises machining a metal, e.g., drilling, routing, lathe turning, etc., in contact with an evaporative cutting fluid comprising chlorofluoroalkane and from about 0.5% to 15% by weight of a nitroalkane having 1 or 2 carbon atoms. In the process of machining a metal, the manner of application of the cutting fluid while not critical is normally selected from two primary methods. The first method is the application of the cutting fluid as a solid stream and the second method is the application of the cutting fluid in droplet form, said droplets being dispersed and evaporated in a stream of compressed air by means of a misting nozzle. It has been found that the latter process prolongs tool life substantially more than does the solid stream method.

The chlorfluoroalkanes which may be used in the present invention are 1,1,2-trichloro-1,2,2-trifluoroethane and trichlorofluoromethane. The nitroalkanes are nitromethane and nitroethane. As will be seen in Examples 1 and 2, the presence of the nitroalkane in the cutting fluid composition accounts for the increase in tool life which results. This beneficial effect of the nitroalkanes is noticeable even at a concentration as low as 0.5 weight percent and it increases with increasing concentration independent of the particular manner of application, In 1,1,2-trichloro-1,2,2-trifluoroethane the effect appears to level off at about 3% by weight of nitroalkane using a misting nozzle whereas in trichlorofluoromethane the effect continues to rise through a concentration of at least about 15% by weight of nitroalkane also using a misting nozzle. Tool life may also be increased by increasing the rate of application of fluid in both solid stream and misting nozzles.

All variables in the manner of application of the fluid are not entirely independent. For example, as shown in Example 5, the employment of larger volumes of air permits the use of lesser amounts of cutting fluid of constant nitromethane content to obtain the same tool life.

Practical limits exist as well, for example, with misting nozzles, application of more than about eight pounds (3.6 kg.) per hour will cause fluid to accumulate on the work. Similarly, concentrations of more than about 15% nitromethane will cause nitromethane residues to accumulate on the work. The efficiency of the misting nozzle in terms of dispersion of the fluid droplets in the air and the amount of co-dispensed air will naturally affect the accumulation of liquid on the work. Nitroalkanes of higher molecular weight than nitromethane although operable are more likely to accumulate on the work because of lesser volatility.

In utilizing the process of this invention, the preferred cutting fluid composition is an approximately 8% by weight solution of nitromethane in trichlorofluoromethane. It is preferred to apply this solution at the rate of about 2 to about 6 lbs. (0.9 to 2.7 kg.) per hour through a misting-type nozzle with about 1 to about 2 standard cu. ft./min. (23 to 57 liters/min.) co-dispensed air. It is also preferable to adjust the rates of these two components within these limits according to the quality of the cutting machine and the particular operation. With a new drill press, the most preferred embodiment in drilling aluminum comprises application of a 5% nitromethane solution in trichlorofluoromethane at the rate of about 2 lbs. (0.9 kg.)/hr. through an efficient misting nozzle which dispenses about 2 standard cu. ft. (23 liters)/min.

Precautions should be taken in confined areas to protect personnel from the accumulation of excessively high cutting fluid vapors. Standards set by the American Conference of Governmental Industrial Hygienists allow a Threshold Limit Value (TLV) of 1,000 p.p.m. for the fluorocarbon portion of the cutting fluid and 100 p.p.m. for nitroethane or nitromethane. The vapors of compositions within the range of this invention are of a low order of toxicity and nonflammable. If gross evaporation occurs (more than 50% by volume), the composition becomes richer in nitroalkane until it eventually becomes flammable.

The following examples are intended to be merely illustrative of the invention and not in limitation thereof. Unless otherwise indicated, all parts are by weight.

EXAMPLES

The utility and effectiveness of the process of this invention were evidenced by a determination of the relative tool life employed in machining metal by said inventive process.

Relative tool life was estimated in drilling by counting the number of holes drilled in aluminum and in titanium alloy specimens under standard conditions before the cutting edge of the drill, as measured across the flutes at the circumference, had worn away 0.015 inch (0.038 mm.). This was measured by means of a scaled ocular 40 power microscope.

The aluminum alloy test specimens consisted of two 4 x 6 inch (10.2 x 15.2 cm.), ¼ inch (6.35 mm.) thick plates of 7075–T6 aluminum alloy bolted together. The alloy is described in Chemical Engineer's Handbook, McGraw-Hill Book Co., New York, N.Y., fourth edition, pp. 23–40 and is commonly used in the aircraft industry. The drill passed through both pieces, i.e., through 0.5 inch (12.7 mm.) of metal.

The titanium alloy test pieces consisted of four 4 x 6 inch (10.2 x 15.2 cm.), ⅛ inch (3.2 mm.) thick plates bolted together. The alloy contained 6% aluminum and 4% vanadium, the rest being titanium. This alloy is used in aircraft.

The test drills used in drilling the aluminum alloy were ¼ inch (6.35 mm.) No. 957 high helix twist drills manufactured by the Cleveland Twist Drill Co. of Cleveland, Ohio. Drills from a single lot were used in each test. The drills turning at 3640 revolutions per minute were advanced into the work at the steady rates shown in examples.

The drills used in drilling the titanium alloy were ¼ inch (6.35 mm.) No. 817 Cobalt 135° split point drills also manufactured by the Cleveland Twist Drill Co.

Cutting fluid was delivered to the work by nozzles placed at an angle of about 30° to the work and directed to the drill hole. Four nozzles were used. One of these delivered a solid stream whereas the other three delivered mists consists of droplets of fluid dispersed in a stream of compressed air.

The solid stream nozzle was a device sold by the B & G Company of Plumsteadville, Pa., and known as the "B & G Applicator." Liquid was supplied to the nozzle under pressure of compressed air in a carrying tank analogous to a garden insecticide sprayer. About 100 p.s.i. (7.03 kg./cm.$^2$) pressure was required to deliver the 2 to 4 lbs. (0.91 to 1.81 kg.) per hour of Example 4. The nozzle diameter was 0.012 inches (0.30 mm.).

The three other devices of the examples mixed air and cutting fluid in their nozzles.

The first of these, hereinafter called the venturi nozzle, is manuafctured by the Mamco Mfg. Co. of Seattle, Wash. The nozzle is characterized in that the cutting fluid is aspirated from the periphery of a central air channel. Cutting fluid is supplied to the periphery slightly upstream from the venturi inner nozzle through a sintered stainless steel ring, the inner portion of which was open to the air channel. Fluid was supplied to the outer periphery of the sintered ring. Air, mixed with aspirated cutting fluid droplets, is carried thereafter through an approximately ¼ inch (6.4 mm.) diameter tube about 1 inch (2.5 cm.) long where the mixture leaves the nozzle. Hereinafter the nozzle is referred to as the venturi nozzle.

The second misting nozzle used in examples was the so-called "Spraymist" nozzle manufactured by the Bijur Lubricating Corp. of Rochelle Park. N.J. That company's flexible extension jet which they designate B–101 and their jet tip designated B–136 were used. The nozzle is characterized in that compressed air and cutting fluid are supplied to the nozzle head by means of two concentric tubes, the cutting fluid being in an inner tube and the compressed air in an annular space. The concentric tubes enter a spray head of relatively large volume from which the mixture exists at the opposite end through a 0.050 inch (1.27 mm.) diameter hole. There is considerable pressure drop in the spray head and apparently considerable turbulence therein thus assuring good mixing. This nozzle is hereinafter referred to as the pressure-drop nozzle.

The third misting nozzle of examples was a part of the so-called "Trico-mist" coolant system manufactured by the Trico Fuse Mfg. Co. of Milwaukee, Wis. The nozzle used in tests, designated by the manufacturer as nozzle P–11–A–160–A, delivers compressed air and cutting fluid separately via parallel tubes to a mixing zone consisting of a ¼ inch (6.4 mm.) tube. Air and cutting fluid mix in the ¼ inch tube mixing zone while moving about 3 inches to a tapered tip where the mixture exits as a mist through a 1/16 inch (1.59 mm.) diameter hole. This nozzle is hereinafter referred to as the parallel tube nozzle.

In experiments with misting nozzles, compressed air was supplied to the nozzles at the pressures stated in examples. In those examples where air flow is stated, the flow was measured by a calibrated floating bob device and air pressure is not stated. Fluid flows were measured by following the loss in weight of the supply tank and additionally by a calibrated floating bob device.

In most examples the average performance of three drills and the standard deviation in three parallel tests is reported.

If no standard deviation is reported, each data point is the result of a single test.

Results within a set are comparable. Results between sets are not necessarily comparable because of variables such as the kind of nozzle, state of wear of drill press bearings, etc.

In connection with the quality of the cutting machine, it was found that the tool life of drills used to drill aluminum was approximately doubled when worn bearings and shaft of an old drill press were replaced with new parts. The findings of Examples 1 through 4 were made with an old drill press. Example 5 shows results obtained in the same press after new bearings and shaft were installed.

EXAMPLE 1

Process of machining aluminum alloy in contact with 1,1,2-trichloro-1,2,2-trifluoroethane and various concentrations of nitromethane This example demonstrates the effectiveness and utility of the process of drilling aluminum alloy in contact with 1,1,2-trichloro-1,2,2-trifluoroethane and nitromethane and the increased tool life which results therefrom as compared with a process utilizing 1,1,2-trichloro-1,2,2-trifluoroethane alone as the cutting fluid.

The conditions of the experiment were the following:

Application by: Parallel tube nozzle
Fluid flow rate: 6 lbs. (2.7 kg.)/hr.
Air pressure: 80 lbs./sq. in (5.6 kg./cm.$^2$)
Drill advance rate: 0.012 in. (0.30 mm.)/revolution The results are shown in Table I following.

TABLE I

| Cutting fluid | Performance (holes) | Standard drill deviation |
|---|---|---|
| 1,1,2-trichloro-1,2,2-trifluoroethane alone | 153 | 1.3 |
| 1,1,2-trichloro-1,2,2-trifluoroethane with— | | |
| 1.5% nitromethane | 170 | 3.3 |
| 2.0% nitromethane | 172 | 2.2 |
| 3.0% nitromethane | 180 | 1.3 |
| 4.0% nitromethane | 180 | 9.2 |
| 5.0% nitromethane | 181 | 7.1 |

EXAMPLE 2

The example demonstrates the increase in tool life effected by the addition of a nitroalkane to the chlorofluoroalkane and the equivalence of nitromethane and nitroethane as cutting fluid additives with trichlorofluoromethane in the process of the present invention.

The conditions of the experiment were the following:

Application by: Parallel tube nozzle
Fluid flow rate: 6 lbs. (2.7 kg.)/hr.
Air pressure: 80 lbs./sq. in. (5.6 kg./cm.$^2$)
Drill advance rate: 0.012 in. (0.30 mm.)/revolution Table II below shows the results.

TABLE II

| Cutting fluid | Performance (holes/drill) | Standard deviation |
|---|---|---|
| Trichlorofluoromethane | 195 | 8.0 |
| Trichlorofluoromethane with— | | |
| 3.0% nitromethane | 208 | 12.0 |
| 3.0% nitroethane | 209 | 8.9 |

EXAMPLE 3

This example, in two parts, demonstrates that the ultilization of the mixture of trichlorofluoromethane and 5% nitromethane as disclosed and used in the process of the present invention, is superior, as evidenced by increased tool life, to a process which utilizes a composition of U.S. Patent 3,129,182 (ethylene glycol monobutyl ether in 1,1,2-trichloro-1,2,2-trifluoroethane) as a cutting fluid in drilling aluminum alloy. The fluid feed rates were from 1 to 8 lbs. (0.45 to 3.6 kg.)/hour and the air flow rates were 4.80 standard cu. ft. (136 liters) and 7.58 standard cu. ft. (214 liters)/minute.

FIG. 1 is a plot of feed rate versus tool life in drilling aluminum allow at 4.80 standard cu. ft. (136 liters)/minute air flow. The curve marked 1 represents the performance of the compositions of U.S. 3,129,182 in a machining process; curve 2 represents the results of the process of the present invention utilizing trichlorofluoromethane containing 5% nitromethane. FIG. 2 illustrates the results of the same experiment employing 7.58 standard cu. ft. (214 liters)/min. air flow and the curves are designated in the same way.

The conditions of the experiments were:

Application by: venturi nozzle
Drill advance rate: 0.006 in. (0.15 mm.)/revolution

EXAMPLE 4

This example demonstrates the utility of the process of this invention and also compares the performance of finely dispersed fluid in relatively large volumes of air, as provided by the venturi nozzle, versus the performance of a solid stream of cutting fluid, i.e., without co-dispensed air.

FIG. 3 shows two curves relating the concentration of nitromethane in trichlorofluoromethane to tool life in drilling aluminum. The lower curve (curve 1) shows the performance of the solid stream nozzle; the upper curve (curve 2) shows the corresponding performance of the venturi nozzle. The conditions of the two experiments are comparable to the extent that from 2 to 4 lbs. (0.9 to 1.8 kg.)/hr. of fluid was supplied by the solid stream nozzle whereas the fluid flow rate from the venturi nozzle was fixed at 4 lbs. (1.8 kg.)/hr. The air flow rate from the venturi nozzle was fixed at 7.5 standard cu. ft. (212 liters)/min. There was, of course, no air flow from the solid stream nozzle.

Comparison of the curves shows that high air flow rates permit lower concentrations of nitromethane than are required in solid stream application to obtain the same tool life.

EXAMPLE 5

Effect of nitromethane concentration in trichlorofluoromethane and other variables in high quality drill press drilling of aluminum The example demonstrates in a high quality drill press the general findings of earlier examples, i.e., performance depends on nitromethane concentration and, in a misting nozzle, the flow rate of co-dispensed air. The performance in the high quality drill press is substantially higher than that of earlier experiments.

The condition of the examples were:

Application by: Pressure drop nozzle
Drill advance rate: 0.006 in. (0.15 mm.)/revolution In the experiment of the lower curve (curve 1) of FIG. 4 fluid was applied at the rate of 4 lbs. (1.8 kg.)/hr.; in the experiment of the upper curve at 2 lbs. (0.9 kg.)/hr. Air was co-dispensed in the experiment of the lower curve at the rate of 0.97 standard cu. ft. (28.2 liters)/min.; in the experiment of the upper curve 2.03 standard cu. ft. (57.5 liters)/min.

The foregoing detailed description has been given for clearness of understanding only and no unnecesary limitations are to be understood therefrom. The invention is not limited to the exact details shown and described, for obvious modifications will occur to those skilled in the art.

The embodiments of the invention in which an exclusive property or privilege is claimed are defined as follows:

1. The process of machining a metal in contact with a cutting fluid comprising a chlorofluoroalkane selected from the group consisting of trichlorofluoromethane and 1,1,2-trichloro-1,2,2-trifluoroethane, and from about 0.5 percent to 15 percent by weight of a nitroalkane having 1 or 2 carbon atoms.

2. The process according to claim 1 wherein the cutting fluid consists esesntially of 1,1,2-trichloro-1,2,2-trifluoroethane and 3.0 weight percent of nitromethane.

3. The process according to claim 1 wherein the cutting fluid consists essentially of trichlorofluoromethane and 3.0 weight percent of nitromethane.

4. The process according to claim 1 wherein the cutting fluid consists esesntially of trichlorofluoromethane and 5.0 weight percent of nitromethane.

5. The process according to claim 1 wherein the cutting fluid consists essentially of trichlorofluoromethane and 8.0 weight percent of nitromethane.

6. The process according to claim 1 wherein the cutting fluid consists esesntially of trichlorofluoromethane and 3.0 weight percent of nitroethane.

References Cited
UNITED STATES PATENTS 3,085,116  4/1963  Kvalnes _____ 260—652.5
3,129,182  4/1964  McLean _____ 252—54

DANIEL E. WYMAN, Primary Examiner

W. J. SHINE, Assistant Examiner

U.S. Cl. X.R.

252—51.5 R, 58; 51—267; 77—55 C; 184—1